United States Patent [19]

Sekine

[11] Patent Number: 4,602,293
[45] Date of Patent: Jul. 22, 1986

[54] MANUSCRIPT READING APPARATUS

[75] Inventor: Akio Sekine, Hino, Japan

[73] Assignee: Kabushiki Kaisha Toshiba, Japan

[21] Appl. No.: 724,333

[22] Filed: Apr. 17, 1985

[30] Foreign Application Priority Data

Apr. 18, 1984 [JP] Japan ................................. 59-57212[U]

[51] Int. Cl.$^4$ .......................... H04N 1/04; H04N 1/40
[52] U.S. Cl. .................................... 358/280; 358/285; 358/294
[58] Field of Search ............... 358/256, 280, 282, 285, 358/293, 294, 75, 163; 382/50

[56] References Cited

U.S. PATENT DOCUMENTS 3,560,646  2/1971  Buc ....................................... 358/294
4,177,449 12/1979  Ikeda .................................. 358/285 X
4,228,468 10/1980  Nagano et al. ...................... 358/280

Primary Examiner—James J. Groody
Assistant Examiner—John C. Fox
Attorney, Agent, or Firm—Finnegan, Henderson, Farabow, Garrett & Dunner

[57] ABSTRACT

Manuscript reading apparatus is constituted by a manuscript guide disposed in the path of the manuscript and formed with a shading correction reference surface, a photoelectric converter for reading the shading correction reference surface prior to the passing of the manuscript along the manuscript guide and for reading a picture image of the manuscript when the same passes along the manuscript guide, memory means for storing the output of the shading correction reference surface when it is read by the photoelectric converter, and correcting means for correcting the read out output of the manuscript picture image outputted from the photoelectric converter in accordance with the content of the memory means. The manuscript guide is provided with a recess in its guide surface and the shading correction reference surface is formed in the recess. With this apparatus it is possible to always obtain stable reference signal and to obtain a picture image signal of adequate tone.

10 Claims, 9 Drawing Figures

MANUSCRIPT READING APPARATUS

BACKGROUND OF THE INVENTION

1. Field of the Invention

This invention relates to a manuscript reading apparatus utilized for a facsimile device or the like, and more particularly an improvement of a manuscript reading apparatus which reads a shading correcting reference surface formed on a manuscript guide before reading a manuscript image, stores the read image output in a memory circuit and effects an electric shading correction based on the content of the memory circuit.

2. Description of the Prior Art

Generally, in a manuscript reading apparatus for use in a facsimile device or the like, light reflected by the picture image of a manuscript illuminated by a light source is collected by a lens system to form an image on the light receiving surface of a photoelectric connecting element so as to derive out an image signal of the manuscript from the output of the photoelectric converting element.

Usually, the image signal thus obtained contains a signal distortion in which the signal level at the central portion of the manuscript is higher than that of the peripheral portion. Such signal distortion is caused by the peripheral effect of the lens, the difference in the luminous characteristics of fluorescent lamps utilized as the light source, and in the characteristic of the photoelectric converting element or the like. Such signal distortion is termed a "shading".

For correcting such shading, according to a prior art apparatus, a shading correction reference surface (for example, a white surface) of a manuscript guide disposed in the path of the manuscript is read by a photoelectric converting element through an optical system including a lens, etc. before reading the picture image of the manuscript, the read signal is stored in suitable memory means as a shading correction reference signal, then the manuscript is inserted in a manuscript reading apparatus for reading the picture image of the manuscript by the same photoelectric converting element and the read out image signal is corrected by the shading correction reference signal stored in the memory means, thereby deriving out an image signal whose shading has been corrected.

However, in the prior art manuscript reading apparatus, since the shading correction reference surface of the manuscript guide is disposed at a position contacting the manuscript, dust on the manuscript and ink particles forming images on the back face of the manuscript may deposit on the reference surface with the result that the reference signal level varies. This fails correct shading correction. For this reason, in the prior art manuscript reading apparatus, it is necessary to always maintain the shading correction reference surface in a clean state, which requires careful maintenance.

SUMMARY OF THE INVENTION

Accordingly, it is an object of this invention to provide a novel manuscript reading apparatus capable of always obtaining a stable reference signal and hence obtaining an image signal of adequate tone or concentration.

Another object of this invention is to provide a manuscript reading apparatus easy for maintenance.

According to this invention, there is provided a manuscript reading apparatus comprising manuscript guide means disposed in the path of a manuscript and formed with a shading correction reference surface, photoelectric converting means for reading the shading correction reference surface of the manuscript guide means and for reading a picture image of the manuscript when the same passes along the manuscript guide means, memory means for storing the output of the shading correction reference surface when it is read by the photoelectric converting means and correcting means for correcting the read out output of the manuscript picture image outputted from the photoelectric converting means in accordance with the content of the memory means. The manuscript guide means is provided with a recess in its guide surface and the shading correction reference surface is formed in the recess.

The shading correction reference surface has a width larger than that of said manuscript and a uniform reflective index such as, for example, a white surface, in a direction of width of the manuscript. Preferably, the recess has at least such a construction that its front edge portion with respect to the manuscript advancing direction is gradually ascends towards this direction and its bottom portion is readable by the photoelectric converting means.

In one embodiment of the present invention, the recess comprises a first portion which abruptly descends, a second portion substantially parallel with a guide surface of the manuscript guide means and a third portion gradually ascending from the second portion, these portions being provided in this order toward the manuscript advancing direction, and the shading correction reference surface is formed on the second portion.

DESCRIPTION OF THE PREFERRED EMBODIMENTS

Figure 1:
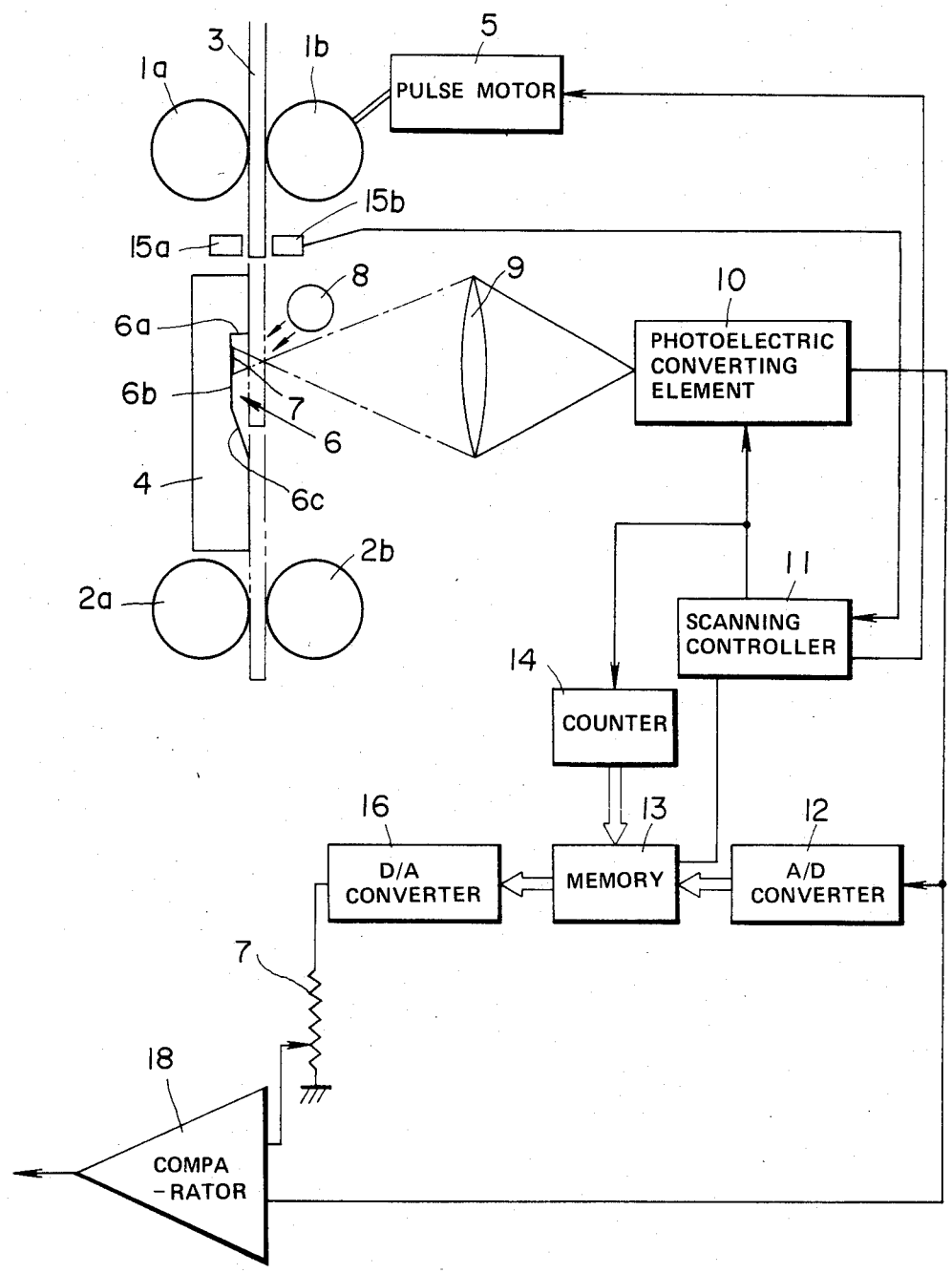
FIG. 1 is a block diagram showing a preferred embodiment of the manuscript reading apparatus according to this invention.

A preferred embodiment of this invention shown in FIG. 1 comprises rollers 1a, 1b; and 2a, 2b for guiding a manuscript 3 along a manuscript guide 4 and a pulse motor 5 for driving the rollers 1a, 1b, 2a and 2b. The manuscript guide 4, which is vertically disposed in the normal operation state of the apparatus, is formed with a recess 6 in its guide surface. The recess 6 has a first portion 6a perpendicular to the guide surface, a second portion 6b substantially parallel with the guide surface and a third surface 6c gradually reaching the guide surface from the second portion 6b. On the second portion 6b is formed a shading correction reference surface 7 having a width larger than that of the manuscript 3 and constituted by a surface having a uniform reflection index, for example, a white surface. The picture image on the manuscript 3 passing on the shading correction reference surface 7 and the manuscript guide 4 is illuminated by the light emitted by a light source 8, and the reflected light is conveyed to a photoelectric converting element 10 through an optical system including a lens 9. The photoelectric converting element 10 is constituted by a large coupled device, for example, using 1728 cells for a manuscript having a size of A4, and 2048 cells for a manuscript having a size of B4. A scanning controller 11 is provided for controlling the photoelectric converting element 10, a memory unit 13 and a counter 14. At the time of starting the operation of the photoelectric converting element 10, the scanning controller 11 sends a start signal to the photoelectric converting element 10, and to the counter 14 and supplies a clock pulse for driving the photoelectric converting element 10 and the counter 14. Also the scanning controller 11 outputs write/read signals for writing a digital signal outputted by an A/D converter 12 into the memory unit 13 and reading out the digital signal stored in the memory unit 13 before the manuscript 3 reaches the manuscript guide 4. The write/read signal is issued by the scanning controller 11 in accordance with the output from a light receiving element 15b which detects the arrival of the manuscript 3 by intercepting the light emitted by a luminous element 15a. The photoelectric converting element 10 begins its operation in reference to the start signal from the scanning controller 11 so as to sequentially outputs respective cell signals in synchronism with the clockpulse outputted by the scanning controller 11.

Figure 2:
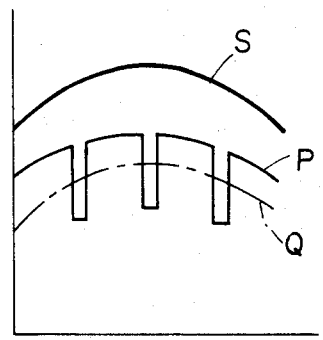
FIGS. 2 and 3 show waveforms useful to explain the operation of the apparatus shown in FIG. 1.
Figure 3:
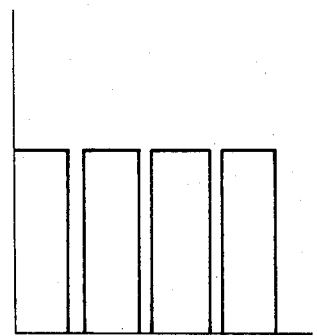

The signal outputted by the photoelectric converting element 10 is converted into a digital signal of 8 bits, for example, by the A/D converter 12. The memory unit 13 has addresses of the number at least equal to the number of cells of the photoelectric converting element 10. Thus, for example, the number of addresses is 1728 where the number of cells of the photoelectric converting element 10 is 1728, whereas the number of addresses is 2048 for 2048 cells. The address of the memory unit 13 is designated by an output of a counter 14 for storing a digital signal outputted from the A/D converter 12. The counter 14 is cleared by the start signal from the scanning controller 11 and the count is performed in response to clock pulses outputted from the scanning controller 11 so as to advance the address of an address designation signal outputted from the counter 14. Consequently, when the photoelectric converter 10 outputs a signal corresponding to a given cell, the counter 14 outputs the address designation signal corresponding to the given cell, so that the memory unit 13 stores a digital signal outputted by the A/D converter 12 at an address corresponding to the given cell. At the time of reading the picture image of the manuscript 3 by the photoelectric converting element 10, the digital signal written before the reading of the manuscript is read out from the memory unit 13. This digital signal is converted into an analogue signal by a D/A converter 16 and the analogue signal is applied to a variable resistor 17 to form a binarizing slice level signal of the read out image signal. This binarizing slice level signal is applied to a comparator 18 to act as a reference signal for comparison. The comparator 18 is also supplied with a read out image signal from the photoelectric converting element 10 so that this image signal is compared with the binarizing slice level signal to form a binary picture image signal. Move particularly, with this construction, a signal as shown by a curve S in FIG. 2 can be derived out as the reference signal for effecting the shading correction, while a signal as shown by a curve P in FIG. 2 can be derived out as a read out picture signal of the manuscript. By dividing the reference signal shown by curve S with a potentiometer 17, a slice level signal as shown by a curve Q in FIG. 2 is formed. Accordingly, by binarizing the read out picture signal with the comparator 18 by using this slice level signal as a reference, it is possible to obtain a shading corrected binary picture signal as shown in FIG. 3.

According to this embodiment, since the shading correction reference surface 7 is recessed with respect to the guide surface of the manuscript guide 4, even when the manuscript 3 is deposited with dust, the dust would not deposite on the shading correction reference surface 7. Accordingly, the reflective index of the shading correction reference surface can always be maintained at the clean initial state, whereby it is possible to always derive out a stable shading correction reference signal. Thereby obtaining an error free picture signal. Moreover, the lower portion of the recess 6, that is, the third portion 6c is inclined with respect to the direction of advance of the manuscript 3, this portion 6c can smoothly guide the leading edge of the manuscript 3 and prevent accumulation of the dust on this portion.

Figure 4:
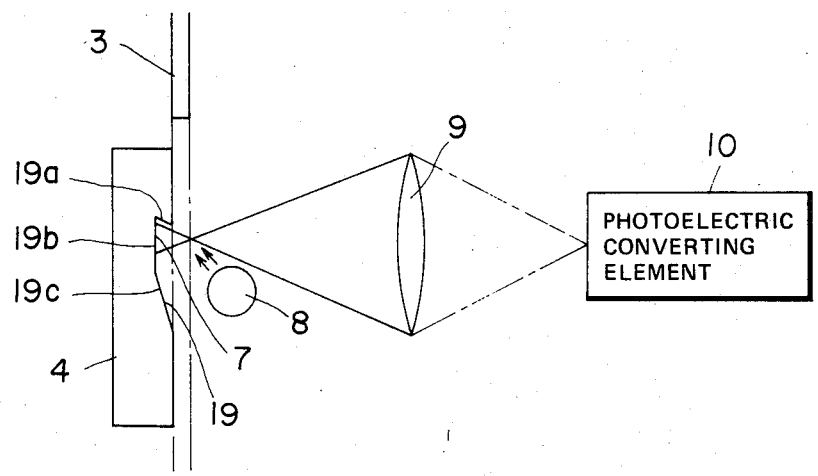
FIG. 4 is a diagrammatic representation of the essential elements showing another embodiment of this invention.
Figure 5:
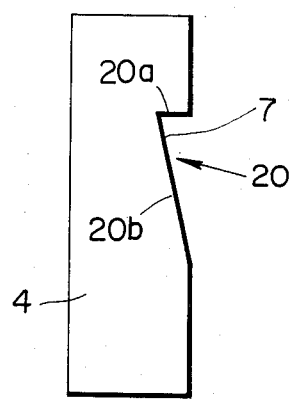
FIG. 5 through 8 show the examples of the recess utilized in this invention.

Another embodiment of this invention shown in FIG. 4 is similar to that shown in FIG. 1 except that the configuration of the manuscript guide 4 and the position of the light source 8 are different. Therefore, FIG. 4 shows only essential elements. In FIG. 4, a recess 19 is provided for the manuscript guide 4, the recess 19 comprising a first portion 19a formed at the side of arrival of the manuscript 3, a second portion 19b parallel with the guide surface of the manuscript guide 4, and a third portion 19c formed on the side of advance of the manuscript. The first portion 19a overhangs the second portion 19b, second portion 19b is formed with a shading correction reference surface 7, and the third portion 19c is inclined with respect to the direction of advance of the manuscript. The light source 8 is disposed on the opposite side of the manuscript. The overhanging angle of the first portion 19a is selected to be substantially equal to the angle of light collection of the lens 9. With this construction, there is no fear of contacting the shading correction reference surface 7 against the manuscript.

It should be understood that the configuration of the recess formed in the manuscript guide 4 for the purpose of providing the shading correction reference surface 7 is not limited to those shown in FIGS. 1 and 2. Thus, FIGS. 5 through 8 show other configurations of the recess provided for the manuscript guide 4. The recess 20 shown in FIG. 5 comprises a first portion 20a at right angle with respect to the surface of the manuscript guide 4, and a linear inclined second portion 20b, wherein the shading correction reference surface 7 is formed on the second portion 20b.

Figure 6:
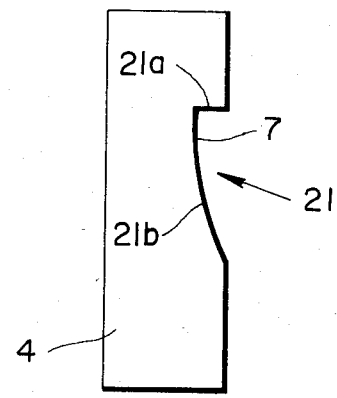

The recess 21 shown in FIG. 6 comprises a first portion 21a perpendicular to the surface of the manuscript guide 4 and a second portion 21b in the form of an arc of a large radius. The shading correction reference surface 7 is formed on the second portion 21b.

Figure 7:
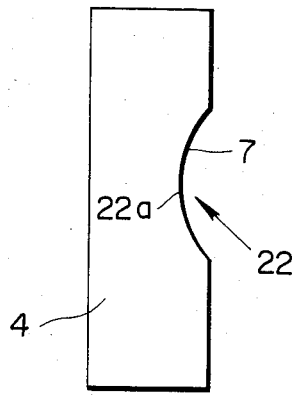

The recess 22 shown in FIG. 7 comprises an arcuate portion 22a provided for the manuscript guide 4. The shading correction reference surface 7 is formed on the arcuate portion 22a.

Figure 8:
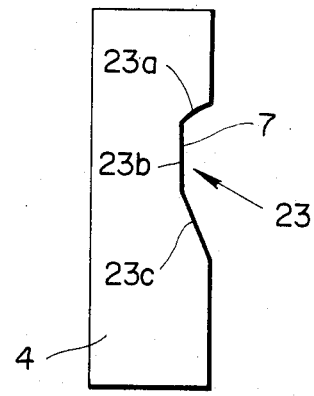

The recess 23 shown in FIG. 8 comprises an arcuate first portion 23a, a flat second portion 23b parallel with the surface of the manuscript guide 4 and a gently sloped third portion 23c. The shading correction reference surface 7 is formed on the second portion 23b.

Figure 9:
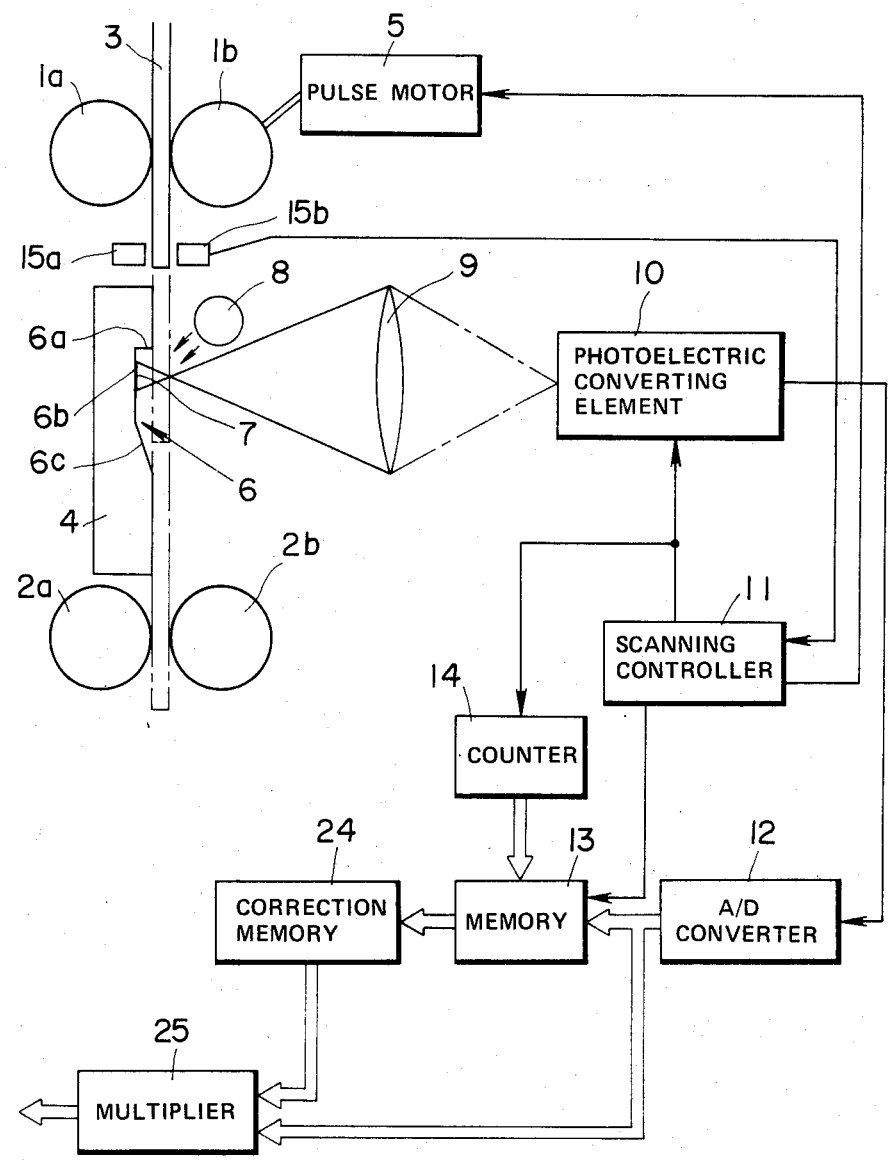
FIG. 9 is a block diagram showing still another embodiment of this invention.

FIG. 9 shows still another embodiment of this invention in which the A/D converter 16, variable resistor 17 and comparator 18 shown in FIG. 1 are substituted by correction memory means 24 and a multiplier 25. In FIG. 9, an output signal of the memory means 14 is inputted to the multiplier 25 though correction memory means 24 storing correction values, while the output signal of the A/D converter 12 is directly inputted to the multiplier. Thus, these two signals are multiplied with each other and their product is outputted by the multiplier 25. An 8 bit (0–255) output of the memory unit 14 is applied to the correction memory means 24 as an address signal and a sized of 0-16383 is outputted from the correction memory means 24. Denoting the input address of the correction memory means 24 by x and the output data by y, data are written into the correction memory means 24 so as to satisfy an equation $$Y = a/x \qquad (1)$$

where a represents a constant; provided that when x=0, y=0. When designing the system, for rendering easy the subsequent processing of the output of the multiplier 25, it is now assumed that the value of a is set to 16384, for example. Then, when x (address) is 1, y(data) is 16384. Data 16384 is stored at address 1 in the correction memory means 24 and respective data (obtained by counting fractions of 0.5 and over as a whole number and disregarding the rest) are stored at respective addresses of the correcting memory device 24. Consequently, at the address 96 is stored data 171 (according to equation (1), y=170.6), at the address 128 is stored data 128 (according to equation (1), y=128 and at address 192 is stored data 85 (according to equation (1), y=85.5).

With the circuit described above, before reading the picture image of the manuscript, the shading correction reference surface 7 is read by the photoelectric converting element 10 so that the respective cells of the memory means 14 are stored with degital signals containing shadings. For example, 96 is stored in the memory means 13 corresponding to the cell at a point L at the lefthand end of the photoelectric converting element 10, 128 is stored in the memory means 13 corresponding to a cell at point M mean the center portion, and 192 is stored in the memory means corresponding to a cell at point N at substantially the center.

In the practical operation, it is assumed that the white portion of the manuscript 3 is read and that data 96 is sent to the cell of point L as the output of the A/D converter 12. Then the counter 14 designates an address so that the memory means 13 outputs data 96 which has been stored at the time of reading. The shading correction reference surface and the outputted data acts as an address signal for the correction memory means, whereby the correction memory means 24 outputs data 171 corresponding to its address 96, and the outputted data is supplied to the multiplier 25. Data 96 is also supplied to the multiplier from the A/D converter 12, whereby a multiplying operation 171×96=16416 is calculated by the multiplier 25 for outputting data 16416. When data 128 is outputted from the A/D converter 12 corresponding to a cell at point M by the same operation as above described the multiplier 25 outputs a data 128×128=16384. Further data 192 is outputted from the A/D converter 12 corresponding to a cell at point N so that the multiplier 25 outputs data 192×85=16320 by the same operation as above described, whereby the outputs of respective cells of the same photoelectric converting element become substantially constant thereby correcting the shading.

What is claimed is:

1. In a manuscript reading apparatus comprising
   manuscript guide means disposed in a path of a manuscript and formed with a shading correction reference surface;
   photoelectric converting means for reading said shading correction reference surface of said manuscript guide means and for reading a picture image of said manuscript when the same passes along said manuscript guide means;
   memory means for storing an output of said photoelectric converting means when it reads said shading correction reference surface; and
   correcting means for correcting the output of said photoelectric converting means when it reads picture images of said manuscript, in accordance with a content of said memory means,
   the improvement wherein said manuscript guide means is provided with a recess in its guide surface and said shading correction reference surface is formed in said recess.

2. The manuscript reading apparatus according to claim 1 wherein said shading correction reference surface has a width larger than that of said manuscript.

3. The manuscript reading apparatus according to claim 1 wherein said shading correction reference surface has a uniform reflectivity in a direction of width of said manuscript.

4. The manuscript reading apparatus according to claim 3 wherein said shading correction reference surface is white.

5. The manuscript reading apparatus according to claim 1 wherein said recess has a front edge portion with respect to a manuscript advancing direction, which gradually ascends toward said direction and has a depth which is determined such that a bottom portion thereof is readable by said photoelectric converting means.

6. The manuscript reading apparatus according to claim 5 wherein said recess further has a rear edge portion which abruptly descends.

7. The manuscript reading apparatus according to claim 6 wherein said rear edge portion overhangs a surface on which said shading correction reference surface is formed.

8. The manuscript reading apparatus according to claim 1 wherein said recess comprises a first portion which abruptly descends, a second portion substantially parallel with a guide surface of said manuscript guide means and a third portion gradually ascending from said second portion toward a manuscript advancing direction, and wherein said shading correction reference surface is formed on said second portion.

9. The manuscript reading apparatus according to claim 1 wherein said manuscript guide means is vertically disposed in the operation state of the apparatus.

10. The manuscript reading apparatus according to claim 1 wherein said photoelectric converting means reads said shading correction reference surface of said manuscript guide means prior to passing of said manuscript along said guide means.

* * * * *